United States Patent
Zhong et al.

(10) Patent No.: US 10,243,982 B2
(45) Date of Patent: Mar. 26, 2019

(54) LOG ANALYZING DEVICE, ATTACK DETECTING DEVICE, ATTACK DETECTION METHOD, AND PROGRAM

(71) Applicant: NIPPON TELEGRAPH AND TELEPHONE CORPORATION, Chiyoda-ku (JP)

(72) Inventors: Yang Zhong, Musashino (JP); Hiroshi Asakura, Musashino (JP); Shingo Orihara, Musashino (JP); Kazufumi Aoki, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 63 days.

(21) Appl. No.: 15/315,756

(22) PCT Filed: Jun. 1, 2015

(86) PCT No.: PCT/JP2015/065772
§ 371 (c)(1),
(2) Date: Dec. 2, 2016

(87) PCT Pub. No.: WO2015/186662
PCT Pub. Date: Dec. 10, 2015

(65) Prior Publication Data
US 2017/0126724 A1 May 4, 2017

(30) Foreign Application Priority Data
Jun. 6, 2014 (JP) .................................. 2014-117756

(51) Int. Cl.
*H04L 29/06* (2006.01)
*G06F 13/00* (2006.01)
(Continued)

(52) U.S. Cl.
CPC .......... *H04L 63/1425* (2013.01); *G06F 13/00* (2013.01); *G06F 21/552* (2013.01);
(Continued)

(58) Field of Classification Search
None
See application file for complete search history.

(56) References Cited

U.S. PATENT DOCUMENTS

| 9,110,882 B2* | 8/2015 | Overell | G06F 17/278 |
| 9,679,491 B2* | 6/2017 | Canoy | G09B 5/00 |
| 2014/0349269 A1* | 11/2014 | Canoy | G06N 99/005 |
| | | | 434/322 |

FOREIGN PATENT DOCUMENTS

| CN | 101086780 A | 12/2007 |
| CN | 101140611 A | 3/2008 |

(Continued)

OTHER PUBLICATIONS

Y. Zhong, et al., "An Anomaly Detection Method for Parameter Manipulation Attacks to Web Application," Computer Security Symposium 2014, Oct. 24, 2014, pp. 474-481 (with English abstract and corresponding to "Detecting Malicious Inputs of Web Application Parameters using Character Class Sequences").

(Continued)

*Primary Examiner* — Simon P Kanaan
(74) *Attorney, Agent, or Firm* — Oblon, McClelland, Maier & Neustadt, L.L.P.

(57) ABSTRACT

A device including: a parameter extracting unit that extracts each parameter from an access request, a character-string class converting unit that, with regard to each parameter, compares each part of a parameter value with a previously defined character string class, replaces the part with a longest matching character string class, and conducting conversion for a class sequence that is sequentially arranged in order of replacement, a profile storing unit that stores, as (Continued)

a profile in a storage unit, a class sequence with the appearance frequency of equal to or more than a predetermined value in the above-described group of class sequences with regard to the access request of the normal data as learning data, and a failure detecting unit that determines the presence or absence of an attack in accordance with the degree of similarity between the above-described class sequence and the profile with regard to the access request.

8 Claims, 22 Drawing Sheets

(51) Int. Cl.
G06F 21/55 (2013.01)
G06N 99/00 (2019.01)
(52) U.S. Cl.
CPC ........ *G06F 21/554* (2013.01); *H04L 63/0245* (2013.01); *H04L 63/1408* (2013.01); *G06N 99/005* (2013.01)

(56) References Cited

FOREIGN PATENT DOCUMENTS

| | | |
|---|---|---|
| CN | 101350054 A | 1/2009 |
| CN | 101950340 A | 1/2011 |
| FR | 2 881 597 A1 | 8/2006 |
| JP | 2011-86192 A | 4/2011 |
| JP | 2013-236308 A | 11/2013 |

OTHER PUBLICATIONS

Y. Zhong, et al., "Detecting Malicious Inputs of Web Application Parameters using Character Class Sequences," 8 pages.
C. Kruegel, et al., "Anomaly Detection of Web-based Attacks," Proceedings of the 10th ACM Conference on Computer and Communications Security, 2003, pp. 251-261.
"ModSecurity," SpiderLabs, <http://blog.spiderlabs.com/2011/02/modsecurity-advanced-topic-of-the-week-real-time-application-profiling.html> Published Feb. 17, 2011, Retrieved Nov. 8, 2016, 6 pages.
A. Stolcke, et al., "Hidden Markov Model Induction by Bayesian Model Merging," Advances in neural information processing systems, 1993, pp. 11-18.
"OWASP Validation Regex Repository," <https://www.owasp.org/index.php/OWASP_Validation_Regex_Repository> Retrieved Nov. 8, 2016, 3 pages.
International Search Report dated Jun. 23, 2015 in PCT/JP2015/065772 filed Jun. 1, 2015.
Extended European Search Report dated Dec. 1, 2017 in Patent Application No. 15803764.8.
Zakia Marrakchi, et al. "Flexible Intrusion Detection Using Variable-Length Behavior Modeling in Distributed Environment: Application to CORBA Objects", Electronic Publishing, Artistic Imaging, and Digital Typography, XP002358950, 2000, pp. 130-144.
Office Action dated Sep. 28, 2018 in Chinese Application No. 201580029516.1 (w/English translation).

* cited by examiner

X: LENGTH OF CLASS SEQUENCE OF PROFILE
Y: LENGTH OF CLASS SEQUENCE OF TEST DATA
Z: LENGTH OF LONGEST COMMON SUBSEQUENCE OF CLASS SEQUENCE OF PROFILE AND CLASS SEQUENCE OF TEST DATA

CLASS-SEQUENCE LCS SIMILARITY DEGREE $S = \frac{Z}{X+Y-Z}$

FIG.7

LEARNING (IN CASE OF file PARAMETER)

LEARNING DATA http://example.com/index.php?id=01&file=img.jpg
http://example.com/index.php?id=02&file=test.png
http://example.com/index.php?id=03&file=top001.png

CLASS-SEQUENCE-CONVERSION ⇩

Img.jpg
Test.jpg
Top001.png (alpha, symbol, alpha)
(alpha, symbol, alpha)
(alpha, numeric, symbol, alpha)

SELECT SINGLE CLASS SEQUENCE WITH MAXIMUM APPEARANCE FREQUENCY (alpha, symbol, alpha) →

PROFILE
(alpha, symbol, alpha)

DETECTION

TEST DATA http://example.com/index.php?id=01&file=Test_011.jpg
http://example.com/index.php?id=02&file=Test_011.jpg' or 1=1

Test_011.jpg
Test_011.jpg' or 1=1

CLASS-SEQUENCE CONVERSION ⇨

(alpha, symbol, numeric, symbol, alpha)
(alpha, symbol, numeric, symbol, alpha, symbol, ...)

SIMILARITY-DEGREE CALCULATION
S>St → NORMAL
S<St → FAULTY

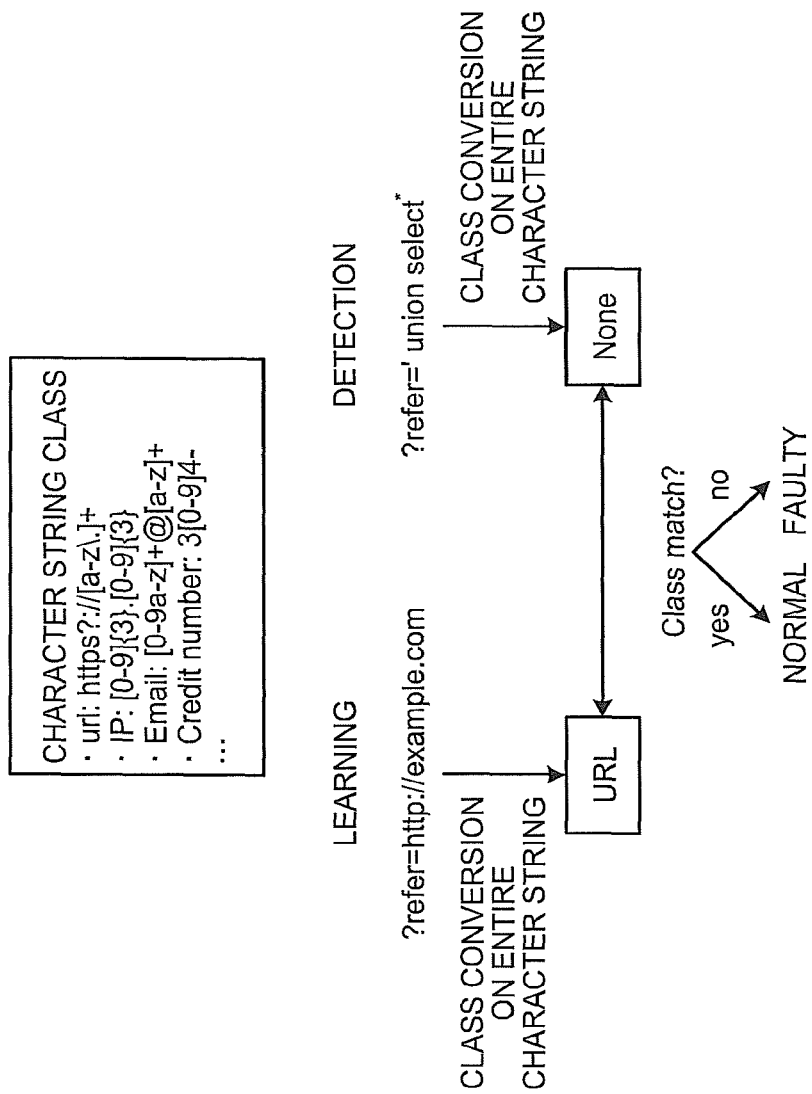

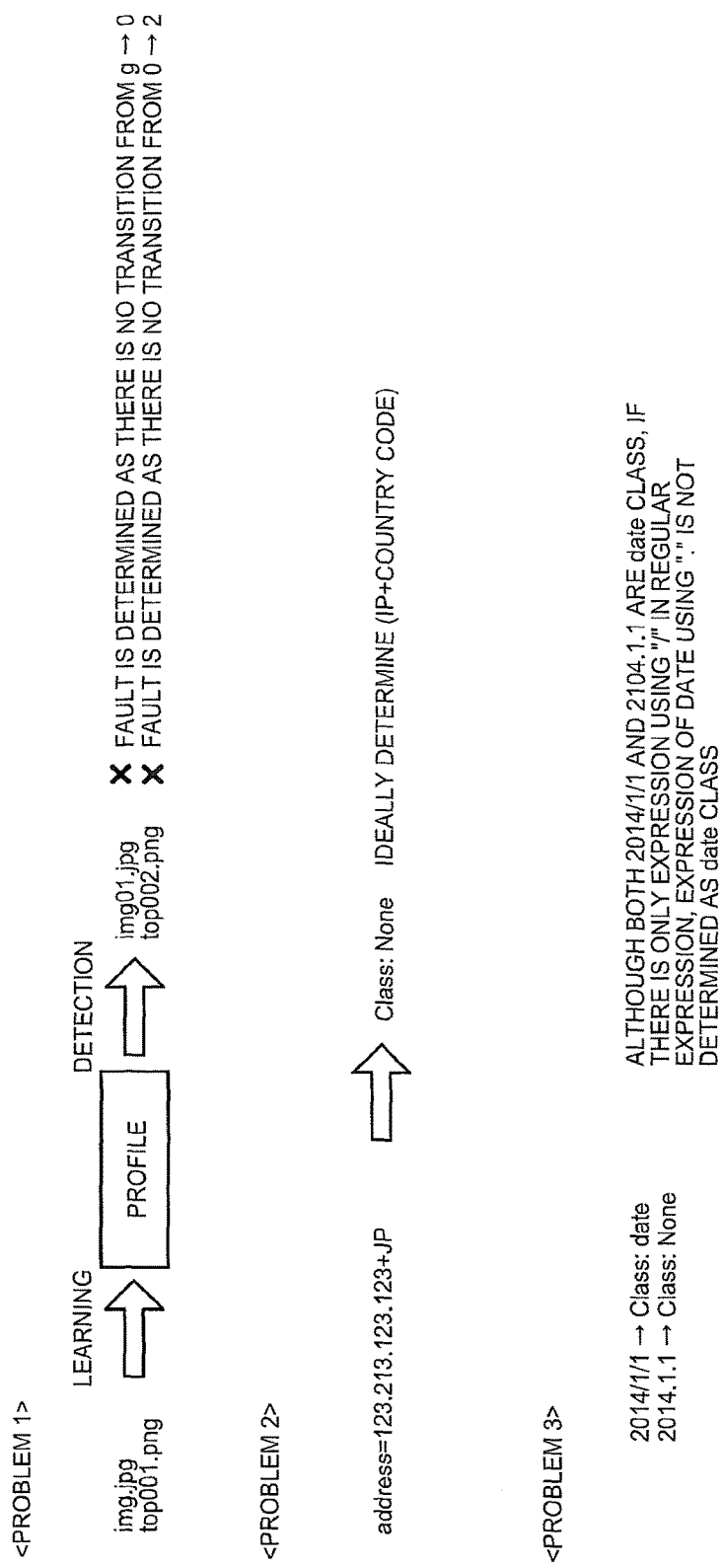

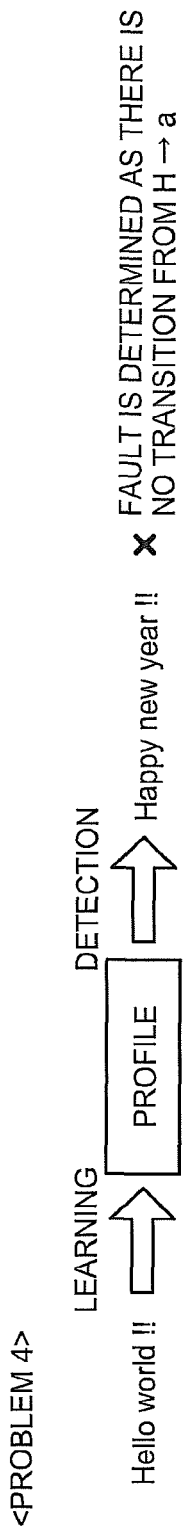

LOG ANALYZING DEVICE, ATTACK DETECTING DEVICE, ATTACK DETECTION METHOD, AND PROGRAM

FIELD

The present invention relates to a technology concerned with network security and, particularly to a technology for analyzing and detecting access with regard to access for conducting attacks on a Web server and a Web application.

BACKGROUND

Systems using the Web have been used in various fields of the society, such as EC (Electronic Commerce). However, as such a system is the infrastructure that is used by general users, Web servers are always exposed to risks of attacks. There have been considerations on various methods of detecting access for conducting attacks on Web servers.

Typically, the methods of detecting attacks include the method of analyzing the details of access with WAF (Web Application Firewall) and the method of analyzing logs that remain in a Web server or an application server. As the attack detection method, there are known two types of detection methods of the signature type and the anomaly type.

FIG. 17 is a diagram that illustrates conventional attack detection methods. FIG. 17(a) is a diagram that illustrates a signature-type attack detection method, and FIG. 17(b) is a diagram that illustrates an anomaly-type attack detection method.

As illustrated in FIG. 17(a), the signature type extracts part of an attack code, with which an attack may be determined, and it detects a request, which matches a pattern, as an attack. Because of an increase in the vulnerability that exists in a Web AP (Web Application), it is difficult to prevent attacks with the signature-type detection, which provide measures against individual vulnerability. Therefore, studies have been made on anomaly detection, during which a profile is generated from a normal request with regard to the Web AP so that a failure is detected.

As illustrated in FIG. 17(b), with the anomaly type, a profile is generated from the normal request, the degree of similarity to the profile is calculated, and a dissimilar request is detected as a failure (see Non Patent Literatures 1 and 2). Hereinafter, the process to generate a profile is referred to as a learning process, and the process to determine whether the analysis target request is an attack by using a profile is referred to as a detection process.

According to the method disclosed in Non Patent Literatures 1 and 2, based on the path section of a Web AP, the profile, which has several sets of feature data, is generated for a parameter included in the path section. The method of generating a profile is explained.

Here, considerations are given to only the feature data on the structure of a character string and the class of a character string, which are considered to largely affect detection results. FIG. 18 is a diagram that illustrates the feature data of a profile.

A conventional technology 1 is the case where the structure of a character string is the feature data, a conventional technology 2 is the case where the class of a character string is the feature data, and a brief explanation is given of the technologies.

First, an explanation is given of the method of generating a profile by using the structure of a character string as feature data according to the conventional technology 1. FIG. 19 is a diagram that illustrates the method of generating a state transition model according to the conventional technology 1.

The steps of the learning process are as follows.

(Step 1) The appearing character is a state, and a state transition model, which enumerates every parameter value, is generated.

(Step 2) From the initial state (s), the same state is connected repeatedly until it cannot be connected, and the finished state transition model is set as a profile (see Non Patent Literature 3 for the way of generating the state transition model).

Furthermore, when a model is generated, consideration needs to be given to the probability of state transition; however, according to the conventional technology 1, as the probability is not considered during detection, it is considered to be equivalent to generation of the model that does not consider the transition probability.

During the detection process, if a character string cannot be output from the profile (state transition model), it is determined to be a failure.

Next, an explanation is given of the method of generating a profile by using the character string format as feature data according to the conventional technology 2. FIG. 20 is a diagram that illustrates the faulty determination method according to the conventional technology 2.

The steps of the learning process are as follows.

(Step 1) A character string class is previously defined (see Non Patent Literature 4 for an example of the definition method).

(Step 2) It is determined whether the entire parameter value fits into the class, and the class name of the fitted class is stored as the profile for the parameter.

During the detection process, the entire parameter value is converted into a class and, if it does not match the class of the profile, a failure is determined.

CITATION LIST

Non Patent Literature

Non Patent Literature 1: Kruegel, Christopher, and Giovanni Vigna, "Anomaly Detection of Web-based Attacks", Proceedings of the 10th ACM conference on Computer and communications security, ACM, 2003.

Non Patent Literature 2: ModSecurity, SpiderLabs, the Internet <URL:http://blog.spiderlabs.com/2011/02/modsecurity-advanced-topic-of-the-week-real-time-application-profiling.html>, 2012

Non Patent Literature 3: Stolcke, Andreas, and Stephen Omohundro, "Hidden Markov model induction by Bayesian model merging", Advances in neural information processing systems (1993): 11-11.

Non Patent Literature 4: OWASP Validation Regex Repository, [searched on 26 May in the 26th year of the Heisei era], the Internet <URL: https://www.owasp.org/index.php/OWASP_Validation_Regex_Repository>

SUMMARY

Technical Problem

With reference to FIG. 21, the problem of the conventional technology is explained.

The conventional technology 1 has a problem in that, as illustrated in the "problem 1" of FIG. 21, as a state transition model is generated with each character, appearing in the learning data, as a state, data that does not exist in the learning data (a case where there is few learning data) often causes false detection.

As illustrated in the "problem 2" of FIG. 21, the conventional technology 2 has a problem in that, as a single character string class is generated for a single parameter, a profile is not generated in the case of a parameter with a complicated structure (e.g., the connection or combination of multiple character string classes that are previously defined).

Furthermore, as illustrated in the "problem 3" of FIG. 21, the conventional technology 2 has a problem in that a profile is not generated in a case where, although similarity may be understood in the eye of human, a different format is provided in a precise sense, and a prepared regular expression of a character string class is not matched.

The present invention has been made to solve the problems of the above-described technologies, and it has an object to provide a log analyzing device, an attack detecting device, an attack detection method, and a program, with which it is possible to prevent the normal data from being determined to be faulty with regard to the request that is transmitted to an information processing apparatus, such as a Web server, via a network.

Solution to Problem

A log analyzing device that analyzes an access log collected from an information processing apparatus connected to a network, the log analyzing device includes:

a storage unit that stores a profile that is a criteria for determining whether analysis-target data indicates an attack on the information processing apparatus;

a parameter extracting unit that extracts each parameter from a request in the access log;

a class converting unit that, with regard to each parameter extracted by the parameter extracting unit, compares each part of a parameter value, from a first character, with a previously defined character string class, replaces the part with a longest character string class that matches the character string class, and conducts conversion for a class sequence in which replaced character string classes are sequentially arranged;

a profile storing unit that stores, as the profile in the storage unit, a class sequence with an appearance frequency of equal to or more than a predetermined value in a group of the class sequences that are obtained by the parameter extracting unit and the class converting unit with regard to the access log of normal data as learning data; and a failure detecting unit that calculates a degree of similarity between the profile and the class sequence that is obtained by the parameter extracting unit and the class converting unit with regard to the access log in the analysis-target data and that determines whether an attack on the information processing apparatus occurs in accordance with the degree of similarity.

An attack detecting device that detects an attack on an information processing apparatus connected to a network, the attack detecting device includes:

a storage unit that stores a profile that is a criteria for determining whether an access request for the information processing apparatus attacks the information processing apparatus;

a parameter extracting unit that extracts each parameter from the access request;

a class converting unit that, with regard to each parameter extracted by the parameter extracting unit, compares each part of a parameter value, from a first character, with a previously defined character string class, replaces the part with a longest character string class that matches the character string class, and conducts conversion for a class sequence in which replaced character string classes are sequentially arranged;

a profile storing unit that stores, as the profile in the storage unit, a class sequence with an appearance frequency of equal to or more than a predetermined value in a group of the class sequences that are obtained by the parameter extracting unit and the class converting unit with regard to the access request of normal data as learning data; and a failure detecting unit that calculates a degree of similarity between the profile and the class sequence that is obtained by the parameter extracting unit and the class converting unit with regard to the access request, which is an analysis target, and that determines whether an attack on the information processing apparatus occurs in accordance with the degree of similarity.

A detection method executed by a detection device, the method including:

a tracking process of giving communication data a tag including attribute information associated with communication destination information of the communication data and tracking propagation of communication data on which the tag is given; and a detecting process of detecting falsification on the communication data when, in the communication data, there is a tag including attribute information different from attribute information corresponding to a transmission destination or a transmission source of the communication data.

A detection program causing a computer to execute:

a tracking step of giving communication data a tag including attribute information associated with communication destination information of the communication data and tracking propagation of communication data on which the tag is given; and a detecting step of detecting falsification on the communication data when, in the communication data, there is a tag including attribute information different from attribute information corresponding to a transmission destination or a transmission source of the communication data.

Advantageous Effects Of Invention

According to the present invention, with regard to a request that is input to an information processing apparatus via a network, a parameter value, extracted from the request, is abstracted into a class sequence that corresponds to parameter values in various forms, and it is determined whether the analysis target data is normal or unauthorized; therefore, it is possible to reduce the possibility of false detection that the analysis-target normal data is determined to be faulty.

BRIEF DESCRIPTION OF DRAWINGS

FIG. 7 is a diagram that illustrates an example of the first embodiment.

FIG. 20 is a diagram that illustrates the faulty determination method according to a conventional technology 2.

FIG. 21 is a diagram that illustrates a problem of the conventional technology.

FIG. 22 is a diagram that illustrates another problem of the conventional technology 1.

DESCRIPTION OF EMBODIMENTS

The present invention relates to an information processing apparatus and a computer that detect access for conducting attacks on the Web server and, although an explanation is given in the following embodiment of a case where the information processing apparatus is a WAF, it may be a log analyzing device that analyzes the details of access (may be logs) to the Web server.

(First Embodiment)

An explanation is given of the configuration of a communication system that includes a WAF according to the present embodiment.

Figure 1:
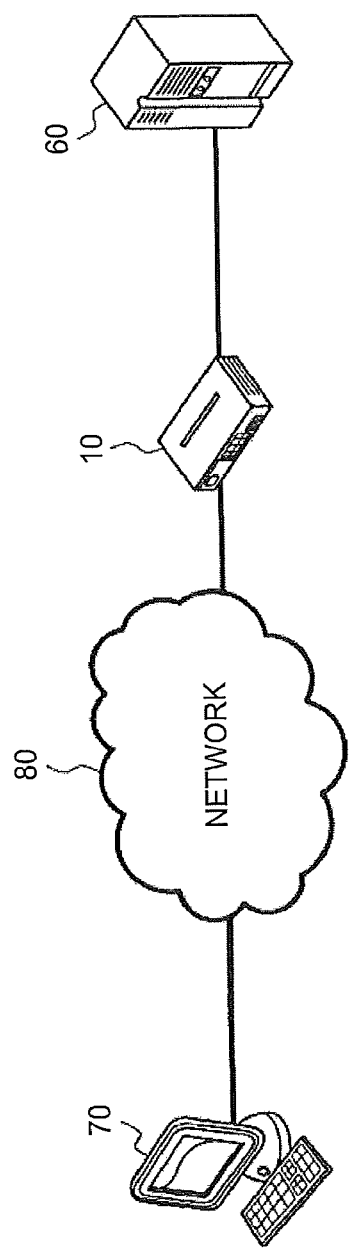
FIG. 1 is a block diagram that illustrates an example of the configuration of a communication system that includes a WAF according to a first embodiment.

FIG. 1 is a block diagram that illustrates an example of the configuration of the communication system that includes the WAF according to the present embodiment.

As illustrated in FIG. 1, the communication system includes a Web server 60, which is the type of information processing apparatus that provides services to a client 70 via a network 80, and a WAF 10 that detects attacks on the Web server 60. The WAF 10 is provided between the network 80 and the Web server 60. The client 70 is connected to the Web server 60 via the network 80 and the WAF 10.

Figure 2:
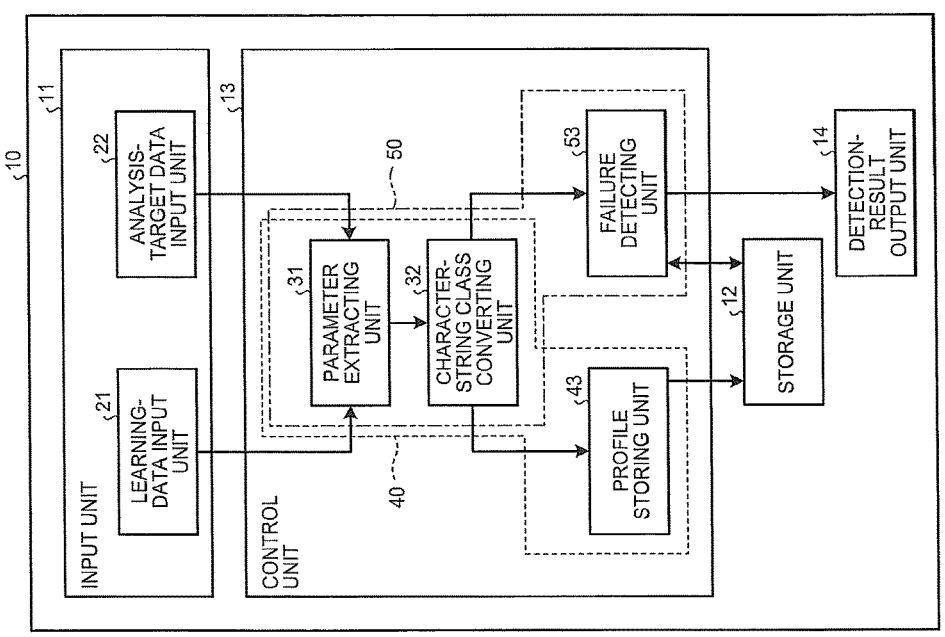
FIG. 2 is a block diagram that illustrates an example of the configuration of the WAF according to the first embodiment.

FIG. 2 is a block diagram that illustrates an example of the configuration of the WAF according to the present embodiment.

As illustrated in FIG. 2, the WAF 10 includes an input unit 11, a storage unit 12, a control unit 13, and a detection-result output unit 14. The input unit 11 includes a learning-data input unit 21 and an analysis-target data input unit 22.

Normal data for the Web server 60 is input as learning data to the learning-data input unit 21 from the network 80. The analysis-target data, which is the data as the target for determination as to whether it attacks the Web server 60, is input to the analysis-target data input unit 22 from the network 80.

The storage unit 12 stores a profile that is the criteria for determining whether the analysis-target data indicates an attack on the Web server 60.

The control unit 13 includes a profiling unit 40 and an analysis-target data processing unit 50. The profiling unit 40 includes a parameter extracting unit 31, a character-string class converting unit 32, and a profile storing unit 43. The analysis-target data processing unit 50 includes the parameter extracting unit 31, the character-string class converting unit 32, and a failure detecting unit 53. The parameter extracting unit 31 and the character-string class converting unit 32 are engaged in processes of the profiling unit 40 and the analysis-target data processing unit 50.

The control unit 13 includes a memory (not illustrated) that stores programs and a central processing unit (CPU) (not illustrated) that performs operations in accordance with the programs. The CPU performs operations in accordance with the programs so that the parameter extracting unit 31, the character-string class converting unit 32, the profile storing unit 43, and the failure detecting unit 53 are implemented in the WAF 10. Furthermore, the memory (not illustrated) stores the information on character string classes for defining how a character string is classified with regard to the value of the parameter extracted from an access request. An explanation is given later of the details of the character string class.

The parameter extracting unit 31 extracts, from an access request that is learning data input from the Web server 60 via the learning-data input unit 21, each parameter of the access and outputs it to the character-string class converting unit 32. Furthermore, the parameter extracting unit 31 extracts, from an access request that is analysis-target data input from the network 80 via the analysis-target data input unit 22, each parameter of the access and outputs it to the character-string class converting unit 32.

With regard to the learning data, the character-string class converting unit 32 converts the value of a parameter, received from the parameter extracting unit 31, into a class sequence on the basis of a character string class and outputs it to the profile storing unit 43. Furthermore, with regard to the analysis-target data, the character-string class converting unit 32 converts the value of a parameter, received from the parameter extracting unit 31, into a class sequence on the basis of a character string class and outputs it to the failure detecting unit 53.

With regard to the learning data, after the profile storing unit 43 receives the group of class sequences, which have been converted by the character-string class converting unit 32, it selects the most frequently appearing class sequence from the group of class sequences of each parameter and stores the selected class sequence as a profile of the parameter in the storage unit 12.

With regard to the analysis-target data, after the failure detecting unit 53 receives the class sequence, which has been converted by the character-string class converting unit 32, it calculates the degree of similarity to the profile of the parameter and compares the calculated degree of similarity with a predetermined threshold, thereby detecting whether the access is faulty. The failure detecting unit 53 notifies the detection result to the detection-result output unit 14. Specifically, if the calculated degree of similarity is more than the threshold, the failure detecting unit 53 determines normality and, if the degree of similarity is less than the threshold, determines failure. That is, it determines that an attack occurs on the Web server 60 or a Web AP of the Web server 60.

The detection-result output unit 14 outputs the detection result received from the failure detecting unit 53.

Next, an operation of the WAF according to the present embodiment is explained.

Figure 3:
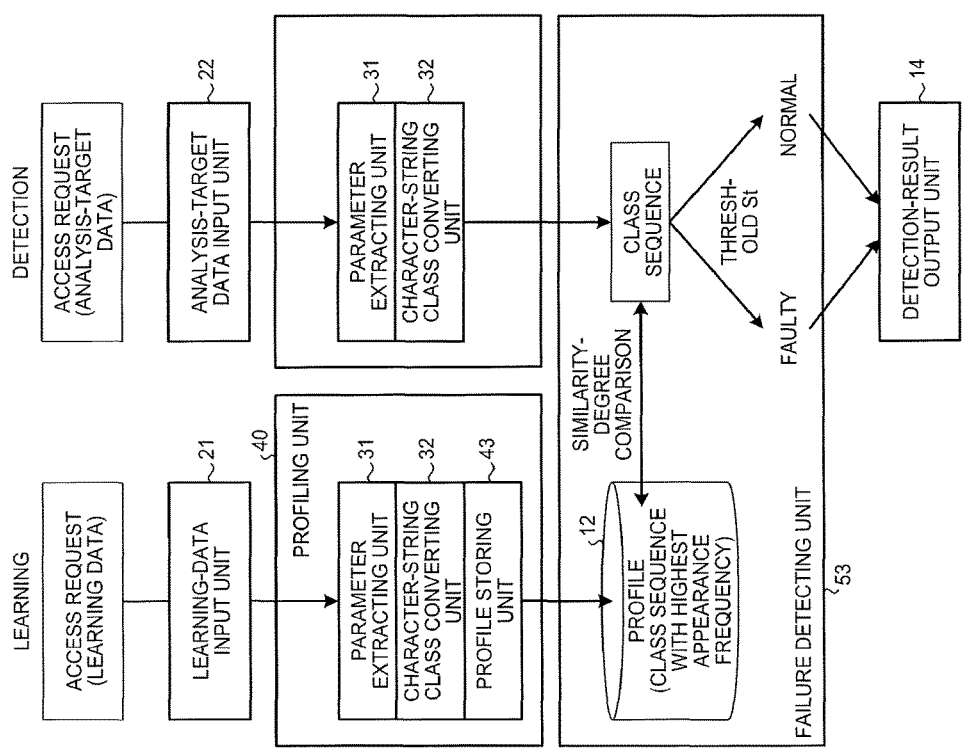
FIG. 3 is a diagram that illustrates the flow of a process in an attack detection method by the WAF according to the first embodiment.

FIG. 3 is a diagram that illustrates the flow of a process in the attack detection method by the WAF according to the present embodiment.

The present embodiment is characterized in "the feature data that is used to generate a profile", "the method of generating a profile during learning and (the structure and data of) the generated profile", and "the method of comparing and checking a profile and an analysis target during detection".

The attack detection method according to the present embodiment has two separate phases of a learning process and a detection process.

During the learning process, the learning-data input unit 21 acquires an access request (learning data) from the network 80. The profiling unit 40 extracts each parameter from the acquired access request (the parameter extracting unit 31) and converts the value of the parameter into a class sequence (the character-string class converting unit 32). Next, the most frequently appearing class sequence is selected from the group of class sequences of each parameter, and it is set as the profile of the parameter (the profile storing unit 43).

During the detection process, the analysis-target data input unit 22 acquires an access request (the analysis-target data) from the network 80. The analysis-target data processing unit 50 extracts a parameter from the access request in the acquired analysis-target data and converts it into a class sequence as is the case with the learning process (the parameter extracting unit 31, the character-string class converting unit 32), calculates the degree of similarity between the class sequence of the parameter and the class sequence of the profile, and detects a failure by using the threshold (the failure detecting unit 53). Then, the detection-result output unit 14 outputs the detection result of the failure detecting unit 53.

Furthermore, the original data, from which a parameter of the request is extracted, may not come from an access request, but packet capture, or the like, may be used.

Next, a detailed explanation is given of the steps of the learning process by the profiling unit 40.

Figure 4:
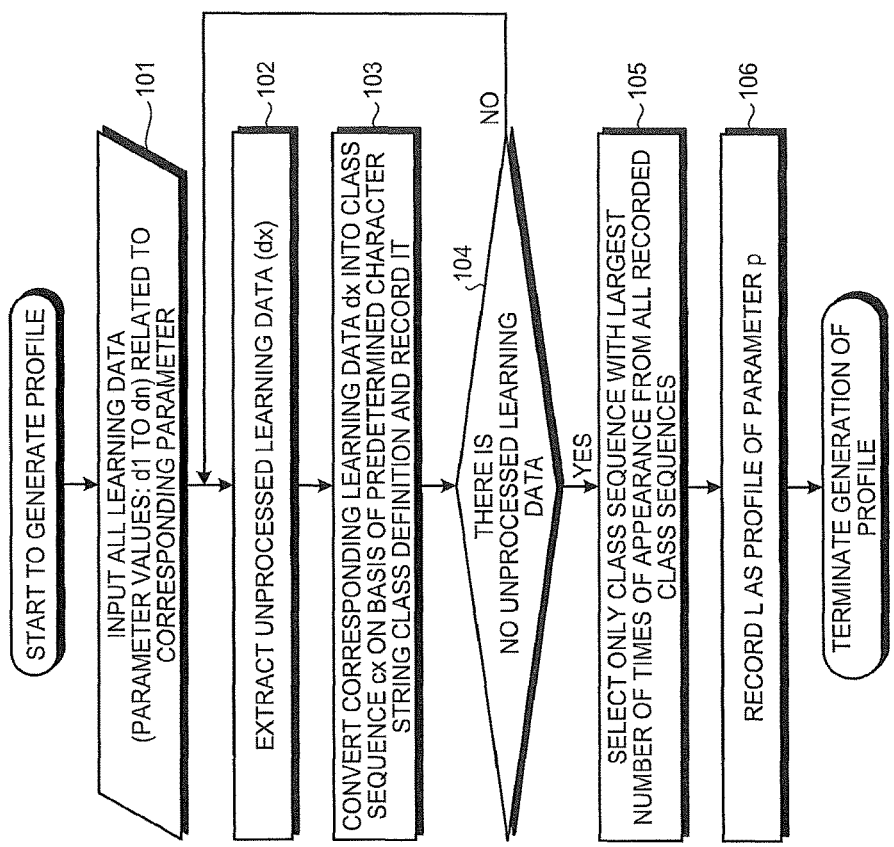
FIG. 4 is a flowchart that illustrates the steps of a learning process by a profiling unit according to the first embodiment.

FIG. 4 is a flowchart that illustrates the steps of the learning process by the profiling unit according to the present embodiment.

The profiling unit 40 performs the following process on each parameter p of the learning target, thereby generating a profile L of the parameter p.

After all the learning data (parameter values: dl to dn) related to the corresponding parameter is input (Step 101), the profiling unit 40 extracts unprocessed learning data (dx) (Step 102). Then, the profiling unit 40 converts the corresponding learning data dx into a class sequence cx on the basis of the predetermined character string class definition and records it (Step 103).

The profiling unit 40 determines whether there is unprocessed learning data (Step 104) and, if there is unprocessed learning data, returns to Step 102 and, if there is no unprocessed learning data, proceeds to Step 105. At Step 105, the profiling unit 40 selects only the class sequence with the largest number of times of appearance from all the recorded class sequences (Step 105). Then, the profiling unit 40 records L as the profile of the parameter p in the storage unit 12 (Step 106).

Figure 5:
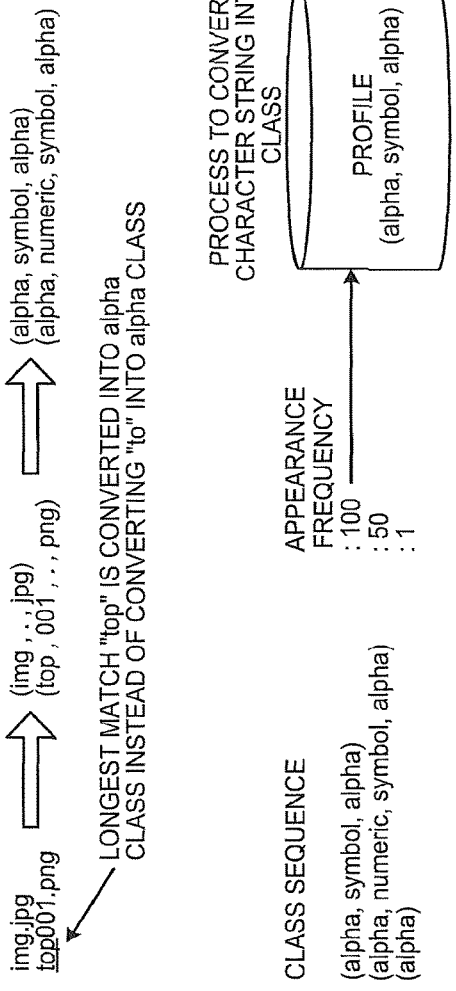
FIG. 5 is a diagram that illustrates the details of operations at Steps 103 and 105, illustrated in FIG. 4.

A detailed explanation is given of the operations at Step 103 and Step 105 in the flowchart illustrated in FIG. 4 by using a specific example. FIG. 5 is a diagram that illustrates the details of the operations at Steps 103 and 105, illustrated in FIG. 4.

The upper section of FIG. 5 illustrates an example of the definition of a character string class, in which multiple types of character strings, indicating the same type of parameter value, are classified into a single class. The character string class includes, for example, the class of "numeric", "space", or the like.

The middle section of FIG. 5 illustrates the situation where each part of the parameter value, from the first character to the last character, is compared with a character string class, the part is replaced with the longest character string class, which matches the character string class, and it is converted into the class sequence where the character string classes are sequentially arranged. The lower section of FIG. 5 illustrates the situation where a class sequence is obtained for each parameter as described above, the appearance frequency of each class sequence is calculated with regard to the group of class sequences, and the class sequence with the maximum appearance frequency is stored as a profile.

The above-described operation is explained with reference to FIG. 4.

At Step 103, when the profiling unit 40 converts a parameter value into a class sequence, it determines that, with regard to the prepared regular expression of the character string class, the longest matching part of the partially matching character string of the parameter value and the class is a single class, and it converts all the character strings into classes sequentially from the left. Thus, it is possible to classify even a parameter with a complicated structure, such as the connection or the combination of multiple ones that are defined as a single character string class according to the conventional definition, into any class.

At Step 105, when the profiling unit 40 selects a class sequence, it selects the class sequence with the maximum appearance frequency, and it is stored as a profile.

Here, specifically, the operation at Step 103 is performed by the character-string class converting unit 32, and the operation at Step 105 is performed by the profile storing unit 43. Furthermore, the information on the definition of the character string class may be stored in the storage unit 12.

Next, an explanation is given of a detection process by the analysis-target data processing unit 50.

Figure 6:
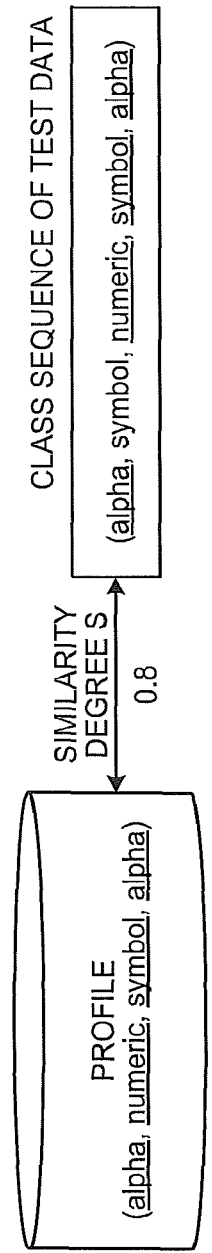
FIG. 6 is a diagram that illustrates a method of calculating the degree of similarity to a profile according to the first embodiment.

FIG. 6 is a diagram that illustrates a method of calculating the degree of similarity to a profile according to the present embodiment. The failure detecting unit 53 of the analysis-target data processing unit 50 conducts detection determination according to the following steps. Here, test data is used as the analysis-target data.

(Step 1) A parameter value is converted into a class sequence as is the case with the learning process.

(Step 2) The class-sequence similarity degree to the profile is determined. As the method of calculating the degree of similarity, for example, LCS (longest common subsequence), illustrated in FIG. 6, may be used.

(Step 3) If a similarity degree S is less than a threshold St, a failure is determined and, otherwise, normality is determined.

An example of the present embodiment is explained. FIG. 7 is a diagram that illustrates the example of the present embodiment. In the present embodiment, the case of a file parameter is explained. Furthermore, test data is used as the analysis-target data.

During the learning process, the profiling unit 40 selects the single class sequence with the maximum appearance frequency. During the detection process, the analysis-target data processing unit 50 conducts class sequence conversion and then conducts the similarity-degree calculation and, according to the result, determines whether it is normal or faulty.

According to the present embodiment, for the WAF that uses the character string structure of a parameter value in the Web application, the characteristics of a parameter and the format of a character string are used so that the parameter value is abstracted into a class sequence that corresponds to parameter values in various forms and it is determined whether the analysis target data is normal or unauthorized; therefore, it is possible to reduce the possibility of false detection that the normal data, which does not exist in the learning data, is determined to be faulty.

(Second Embodiment)

According to the first embodiment, the single class sequence with the maximum appearance frequency is selected during class sequence selection, and the class sequence is set as a profile; however, according to the present embodiment, any of the following modified examples 1 to 3 is used as an alternative technique in the method for selecting a class sequence.

MODIFIED EXAMPLE 1

The u class sequences are selected in descending order of the appearance frequency.

MODIFIED EXAMPLE 2

The class sequence with equal to or more than v % of the appearance frequency is selected.

MODIFIED EXAMPLE 3

Appearance frequencies fx are sorted in descending order (f'1, f'2, f'3 . . . ), and the u class sequences (c'1, c'2, . . . c'u) are selected, of which the sum (contribution rate) of appearance frequencies exceeds Ft for the first time (f'1+f'2+. . . +f'u>Ft).

Figure 8:
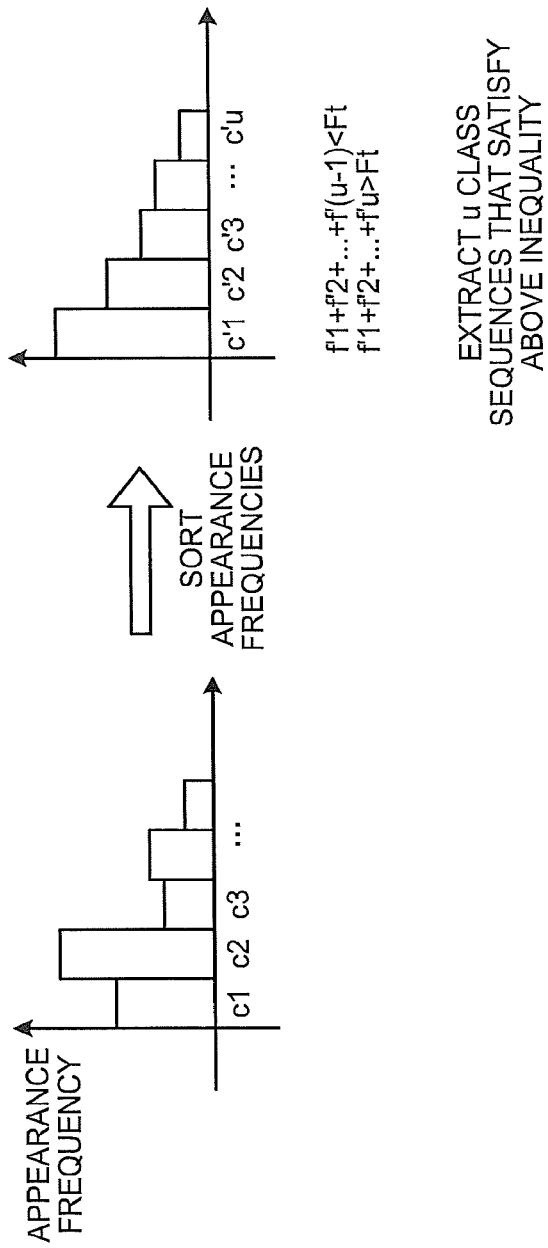
FIG. 8 is a diagram that illustrates a modified example 3 according to a second embodiment.

FIG. 8 is a diagram that illustrates the modified example 3 according to the present embodiment.

The profile storing unit 43 sorts the appearance frequencies in the graph that indicates the appearance frequencies, and it extracts the u class sequences that satisfy the inequality illustrated in FIG. 8.

An explanation is given of the learning process by the profiling unit according to the present embodiment.

Figure 9:
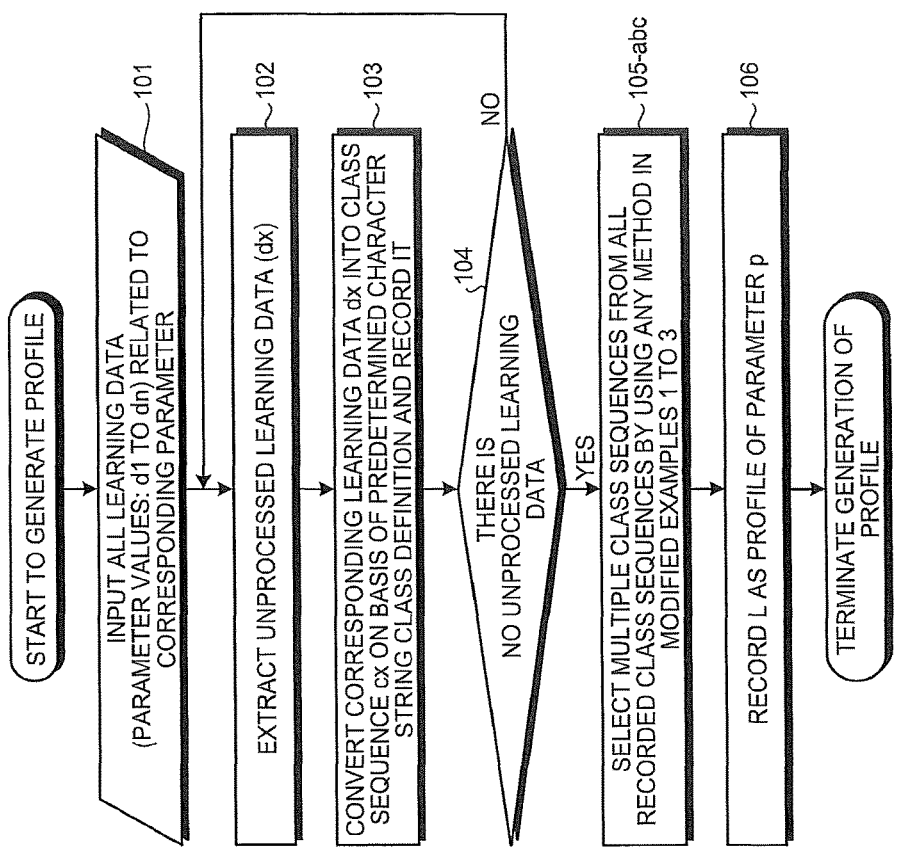
FIG. 9 is a flowchart that illustrates the steps of a learning process by the profiling unit according to the second embodiment.

FIG. 9 is a flowchart that illustrates the steps of the learning process by the profiling unit according to the present embodiment.

According to the present embodiment, the operation at Step 105-*abc*, illustrated in FIG. 9, is performed instead of the operation at Step 105 in the flowchart illustrated in FIG. 4. In the present embodiment, the operation at Step 105-*abc* is explained, and the explanations for the operations at the other steps are omitted.

At Step 105-*abc*, the profiling unit 40 selects multiple class sequences from all the recorded class sequences by any one of the methods according to the modified examples 1 to 3.

Figure 10:
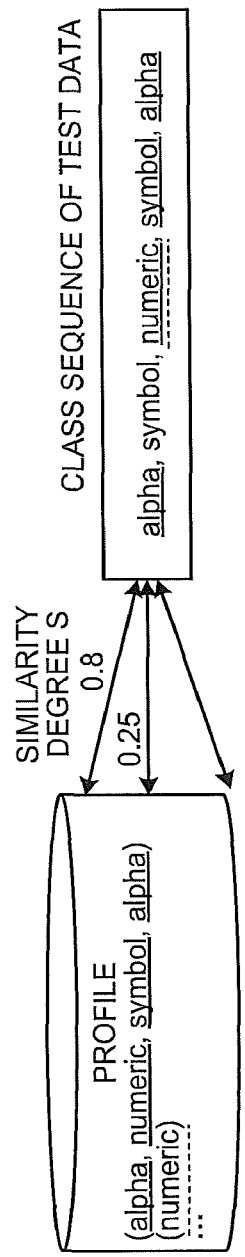
FIG. 10 is a diagram that illustrates a method of calculating the degree of similarity to a profile according to the second embodiment.

An explanation is given of calculation of the degree of similarity during detection according to the present embodiment. FIG. 10 is a diagram that illustrates a method of calculating the degree of similarity to a profile according to the present embodiment.

With regard to the degree of similarity during detection, if the u class sequences are selected according to the modified examples 1 to 3, the maximum degree of similarity Smax=max(s1, s2, . . . su) among the degrees of similarity (s1, s2, . . . su) between the class sequence of the profile and each of the u class sequences is the degree of similarity to the profile.

In the case of this example, the similarity degree S between the test data and the profile is 0.8.

Figure 11:
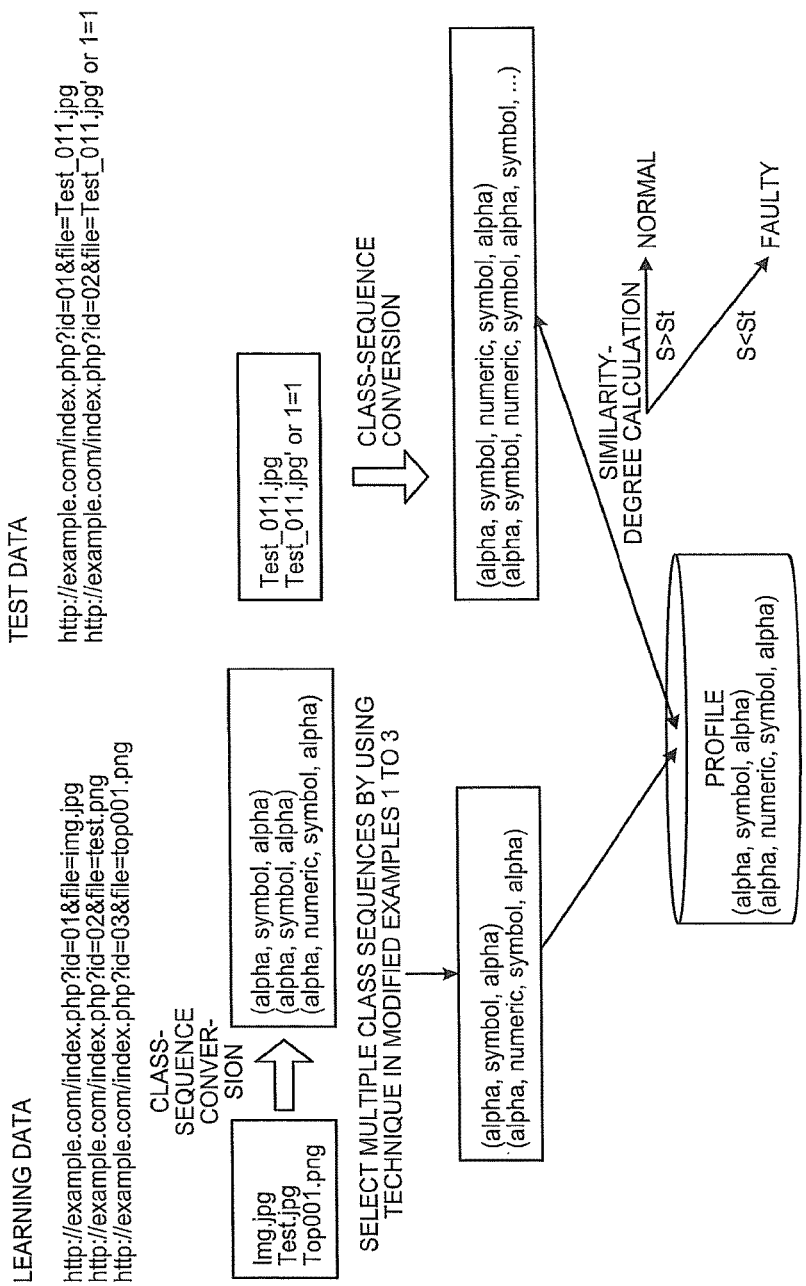
FIG. 11 is a diagram that illustrates an example of the second embodiment.

An example of the present embodiment is explained. FIG. 11 is a diagram that illustrates the example of the present embodiment. In the present embodiment, too, the case of a file parameter is explained.

During the learning process, the profiling unit 40 selects multiple class sequences by using any one of the techniques in the modified examples 1 to 3. During the detection process, after the analysis-target data processing unit 50 conducts class sequence conversion, it calculates the degree of similarity and, according to the result, determines whether it is normal or faulty.

(Third Embodiment)

The single class sequence is set as a profile according to the first embodiment, and multiple class sequences are set as a profile according to the second embodiment; however, according to the present embodiment, a selection is made as to whether multiple class sequences (hereinafter, referred to as the "class sequence group") are used as a profile, or the class group, to which no consideration is given to the order of classes, is used.

Furthermore, multiple class sequences, which are selected according to the second embodiment, may be applied to the present embodiment, and furthermore, any of the modified examples 1 to 3, explained in the second embodiment, may be applied to the present embodiment.

Here, another problem of the conventional technology 1 is explained. The conventional technology 1 has a problem in that, as a state transition model is generated for each single character that actually appears in the learning data, parameters with a high flexibility in character strings often cause false detection. This problem is the "problem 4". FIG. 22 illustrates an example of the problem 4.

An explanation is given of the method of generating a profile according to the present embodiment.

Figure 12:
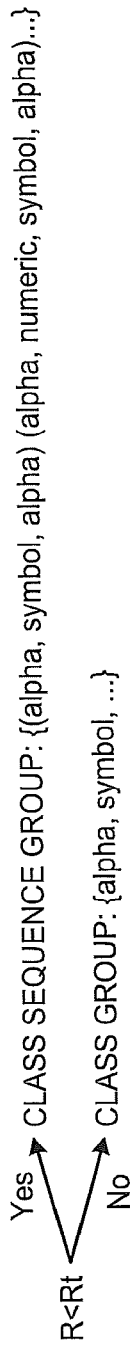
FIG. 12 is a diagram that illustrates the method of generating a profile according to the third embodiment.

FIG. 12 is a diagram that illustrates the method of generating a profile according to the present embodiment, and it illustrates the method of generating a profile using a compression rate R.

According to the present embodiment, the profile storing unit 43, illustrated in FIG. 2, determines whether the compression rate (R) of the class sequence group is less than a threshold Rt and, if the compression rate is less than the threshold, sets the group of class sequences as a profile, as illustrated in FIG. 12.

Conversely, if the compression rate is more than the threshold, the profile storing unit 43 sets the class group as a profile. The class group is the group of unique appearing classes, and the appearance order of classes is not retained. Specifically, in the class group, the character string classes (alpha, numeric, or the like), included in the group of class sequences, are not overlapped, and furthermore the appearance order is not defined.

According to the present embodiment, although the group of class sequences considers the order of character string classes, the class group does not consider the order of character string classes.

Figure 13:
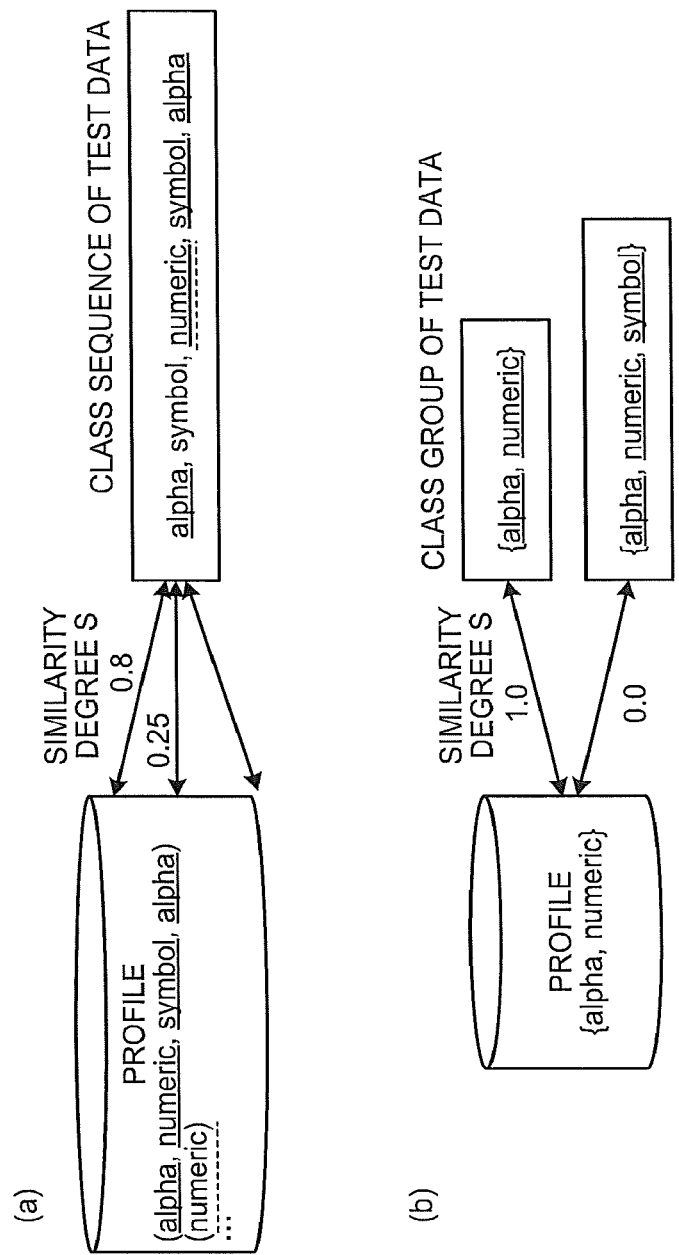
FIG. 13 is a diagram that illustrates calculation of the degree of similarity according to the third embodiment.

An explanation is given of calculation of the degree of similarity during detection according to the present embodiment. FIG. 13 is a diagram that illustrates calculation of the degree of similarity according to the present embodiment.

According to the present embodiment, there is a need to change the method of calculating the degree of similarity during detection in a case where a profile is generated by using a class sequence group and in a case where a profile is generated by using a class group.

FIG. 13(a) illustrates the method of calculating the degree of similarity in a case where the profile is of the class-sequence group type, and FIG. 13(b) illustrates the method of calculating the degree of similarity in a case where the profile is of the class-group type.

(1) In a case where the profile is of the class-sequence group type, with regard to the degree of similarity during detection, the maximum degree of similarity Smax=max (s1, s2, . . . su) among the degrees of similarity (s1, s2, . . . , su) between the class sequence of the profile and each of the u class sequences is set as the degree of similarity to the profile (the same as the method of calculating the degree of similarity according to the modified examples 1 to 3).

(2) In a case where the profile is of the class-group type, if a class group is included in the class group of the profile, the similarity degree S is 1.0 and, in a case of mismatch, it is 0.0.

An explanation is given of the learning process by the profiling unit according to the present embodiment. Here, the case of the modified example 2 in the second embodiment is explained.

Figure 14:
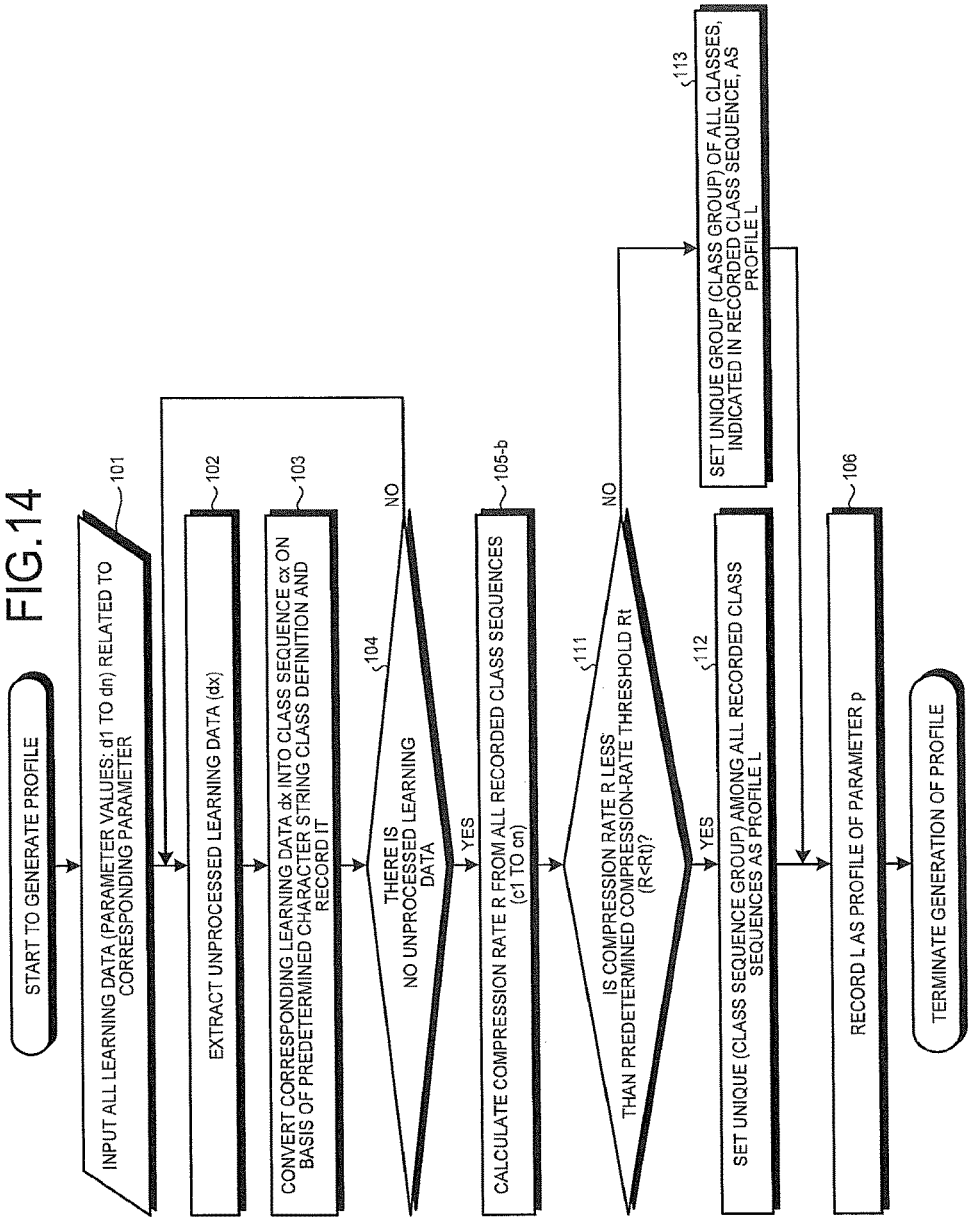
FIG. 14 is the flowchart that illustrates the steps of a learning process by the profiling unit according to the third embodiment.

FIG. 14 is the flowchart that illustrates the steps of the learning process by the profiling unit according to the present embodiment.

According to the present embodiment, in the flowchart illustrated in FIG. 9, Step 105-b that corresponds to the modified example 2 is set at Step 105-abc, and Steps 111 to 113 are added between the operations at Step 105-b and Step 106, as illustrated in FIG. 14. In the present embodiment, the operations at Step 105-b and Steps 111 to 113 are explained, and the explanations for the operations at other steps are omitted.

At Step 105-b, the profiling unit 40 calculates the compression rate R from all the recorded class sequences (c1 to cn). At Step 111, the profiling unit 40 determines whether the compression rate R is less than the predetermined compression-rate threshold Rt.

If R<Rt during determination at Step 111, the profiling unit 40 sets the unique (class sequence group) among all the recorded class sequences as the profile L (Step 112). Conversely, if R>Rt during determination at Step 111, the profiling unit 40 sets the unique group (class group) of all the classes, indicated in the recorded class sequence, as the profile L (Step 113).

Figure 15:
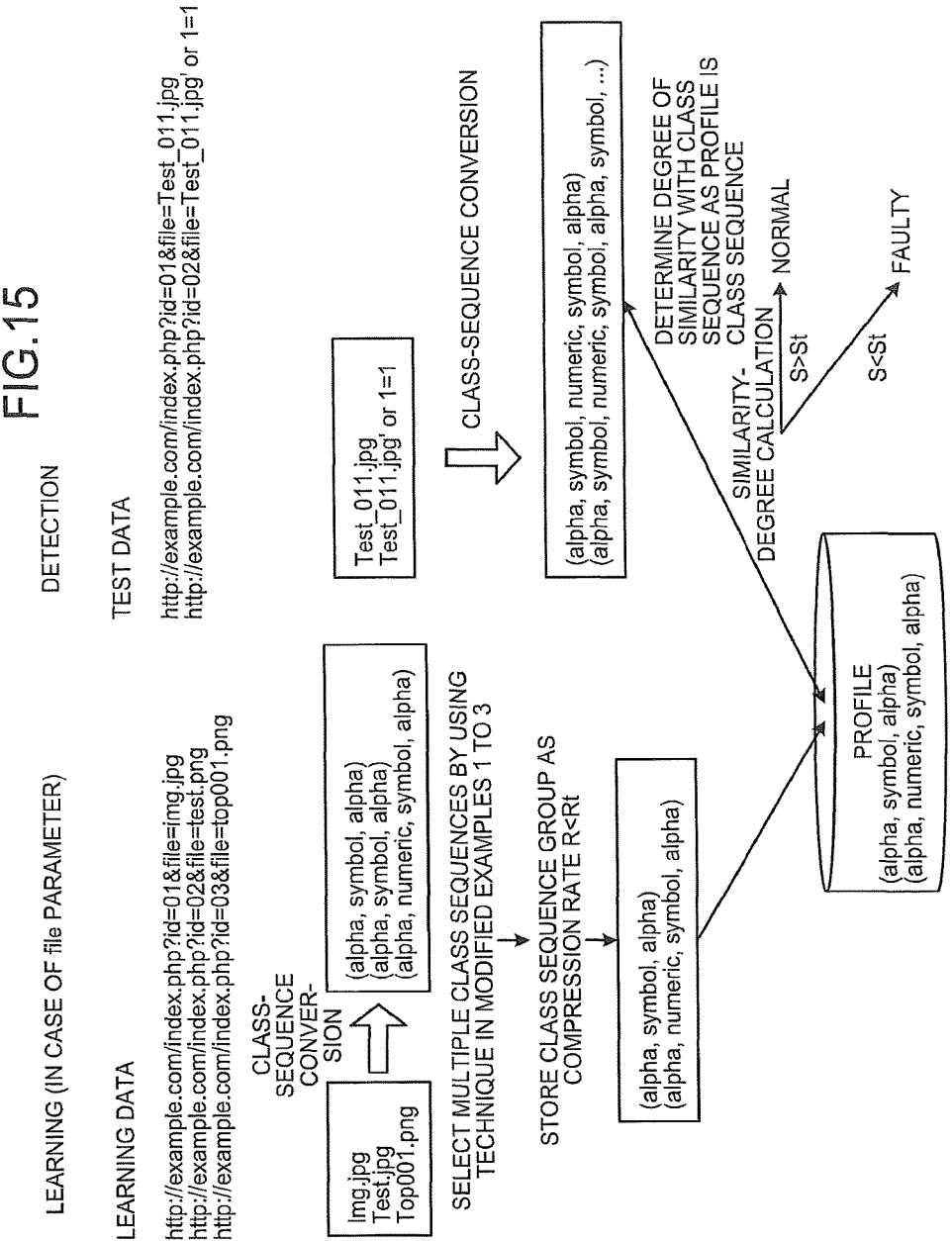
FIG. 15 is a diagram that illustrates an example of the third embodiment.

An example of the present embodiment is explained. FIG. 15 is a diagram that illustrates the example of the present embodiment. In the present embodiment, the case of a file parameter is explained.

During the learning process, the profiling unit 40 selects multiple class sequences by using any of the techniques in the modified examples 1 to 3. Then, as the compression rate R<Rt, the class sequence group is stored. During the detection process, after the analysis-target data processing unit 50 conducts class sequence conversion, it conducts calculation of the degree of similarity with the class sequence as the profile is a class sequence and, according to the result, determines whether it is normal or faulty.

An explanation is given of the effect of the attack detecting device according to the present invention by comparison with the problems 1 to 4 that are explained with reference to FIG. 21 and FIG. 22.

With regard to the problem 1 that is explained with reference to FIG. 21, according to the present invention, as a character string is treated by being abstracted into a class, faulty determination may be conducted in consideration of differences in additional characters, or the like, whereby false detection may be reduced. Furthermore, as the LCS similarity degree of class sequences is used during detection, even if data appears, to which an additional character is attached to the data at the time of learning, a high degree of similarity is exhibited, whereby false detection may be reduced.

With regard to the problem 2 that is explained with reference to FIG. 21, according to the present invention, as the character-string class converting unit generates a class sequence on the assumption that a parameter is a connection or combination of multiple character string classes, the profile suitable for the parameter may be generated.

With regard to the problem 3 that is explained with reference to FIG. 21, according to the present invention, the character string class defines the simple character string class, such as numeric or alpha, in addition to definition of the complicated character string class, such as url or ip; therefore, even if it is difficult to determine that the character string "2014.1.1" is the date type, the class sequence (numeric, symbol, numeric, symbol, numeric) may be generated as a profile.

With regard to the problem 4 that is explained with reference to FIG. 22, according to the invention explained in the third embodiment, as the idea of the class group is introduced, a fault is determined for a parameter with a high flexibility in the less constrained condition, whether or not a class appears, instead of the order of classes, whereby false detection may be reduced.

According to the present invention, with the method of detecting attacks on a Web application, by using the character string structure of a parameter value and by using the characteristics of a parameter and the format of a character string, it is possible to reduce the possibility of false detection that normal data, which does not exist in the learning data, is determined to be faulty, and false detection for a parameter with a high flexibility.

Figure 16:
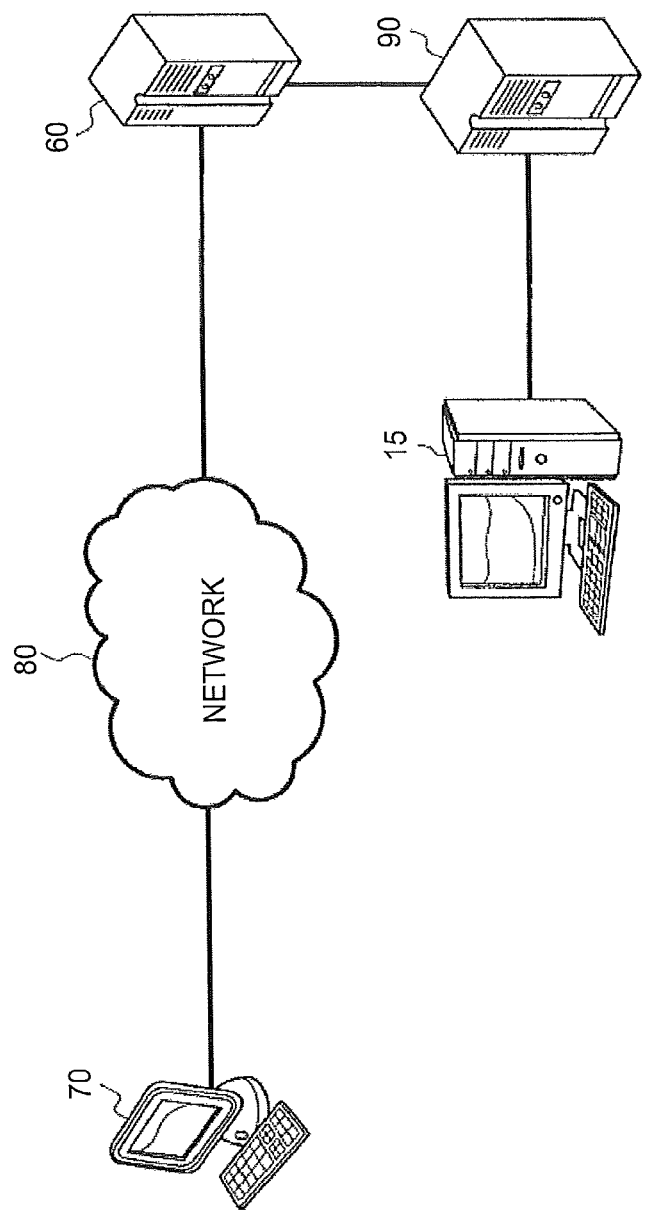
FIG. 16 is a block diagram that illustrates an example of the configuration of a log analysis system that includes an attack detecting device according to the present invention as a log analysis server.
Figure 17:
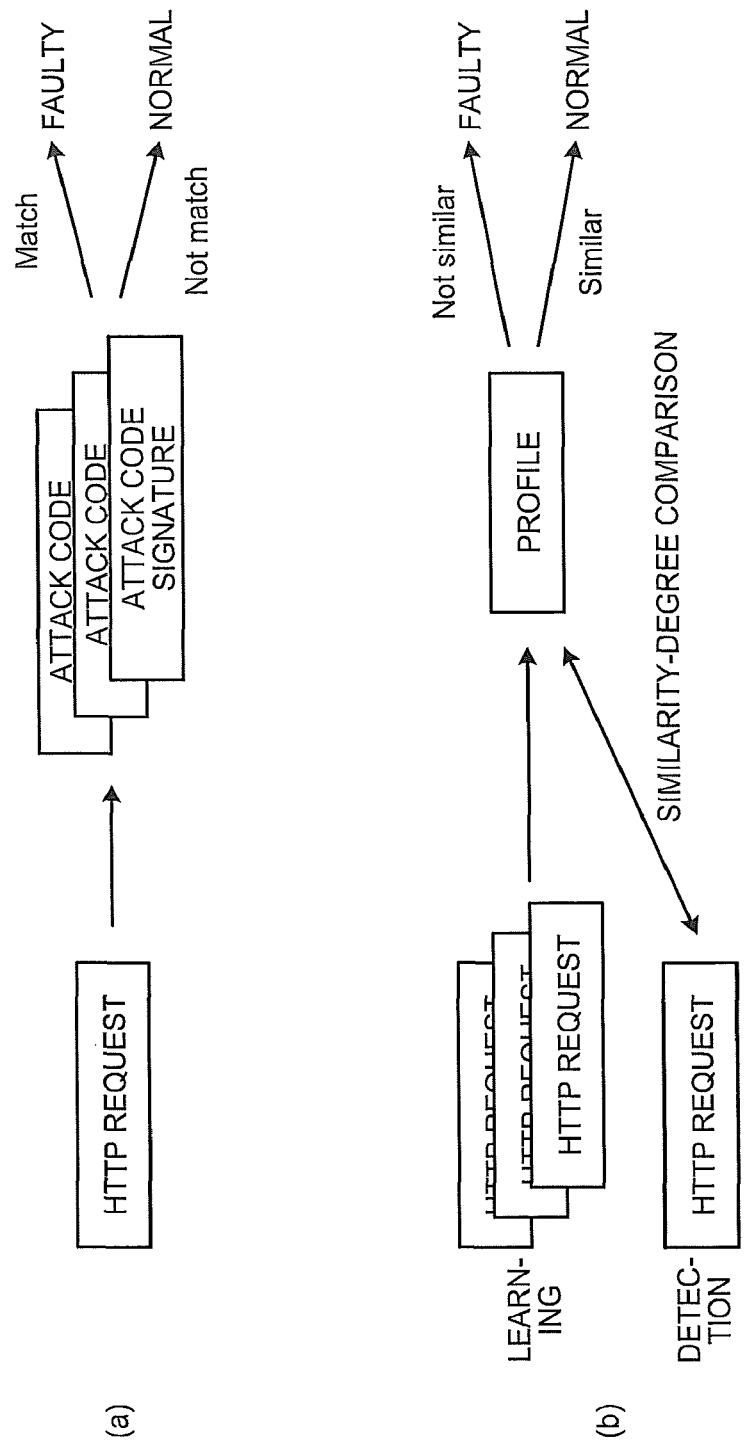
FIG. 17 is a diagram that illustrates a conventional attack detection method.
Figure 18:
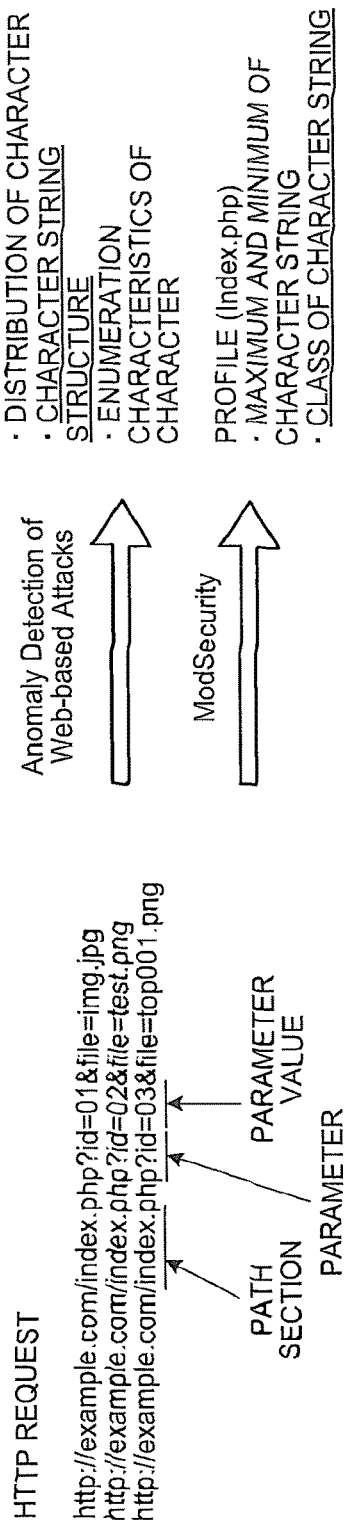
FIG. 18 is a diagram that illustrates the feature data on a profile.
Figure 19:
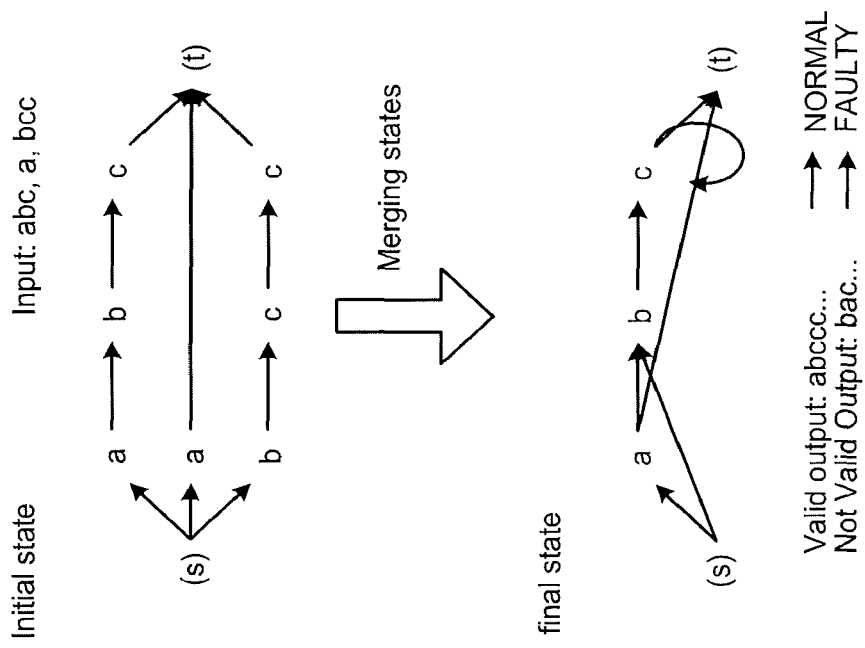
FIG. 19 is a diagram that illustrates the method of generating a state transition model according to a conventional technology 1.

Furthermore, a log analysis system that includes the WAF, explained in the above embodiment, as a log analysis server is also applicable. FIG. 16 is a block diagram that illustrates an example of the configuration of a log analysis system that includes the attack detecting device according to the present invention as a log analysis server.

The log analysis system includes the Web server 60, a log server 90, and a log analysis server 15. The log server 90 is connected to the Web server 60. The log server 90 acquires the information on access logs from the Web server 60 on a regular basis and stores it in the storage unit of the corresponding apparatus.

The log analysis server 15 is connected to the log server 90. The log analysis server 15 has the function of the WAF 10, explained in the above embodiment, so that it reads and analyzes an access request from the access log so as to detect an attack on the Web server 60.

REFERENCE SIGNS LIST

10 WAF
15 LOG ANALYSIS SERVER
13 CONTROL UNIT
12 STORAGE UNIT
31 PARAMETER EXTRACTING UNIT
32 CHARACTER-STRING CLASS CONVERTING UNIT
40 PROFILING UNIT
43 PROFILE STORING UNIT
50 ANALYSIS-TARGET DATA PROCESSING UNIT
53 FAILURE DETECTING UNIT
60 WEB SERVER

The invention claimed is:

1. A log analyzing device that analyzes an access log collected from an information processing apparatus connected to a network, the log analyzing device comprising:
   a memory that stores a profile that is a criteria for determining whether analysis-target data indicates an attack on the information processing apparatus; and
   processing circuitry configured to
   perform an extraction of each parameter from a request, received from a client device via the network, in the access log;
   with regard to each parameter extracted perform a class conversion to compare each part of a parameter value, from a first character, with a previously defined character string class, replace the part with a longest character string class that matches the character string class, and conduct conversion for a class sequence in which replaced character string classes are sequentially arranged;
   store, as the profile in the memory, a class sequence with an appearance frequency of equal to or more than a predetermined value in a group of the class sequences that are obtained by the parameter extraction and the class conversion with regard to the access log of normal data as learning data; and
   calculate a degree of similarity between the profile and the class sequence that is obtained by the parameter extraction and the class conversion with regard to the access log in the analysis-target data and determine whether an attack on the information processing apparatus occurs in accordance with the degree of similarity.

2. An attack detecting device that detects an attack on an information processing apparatus connected to a network, the attack detecting device comprising:
   a memory that stores a profile that is a criteria for determining whether an access request for the information processing apparatus attacks the information processing apparatus; and
   processing circuitry configured to
   perform an extraction of each parameter from the access request;
   with regard to each parameter extracted, compare each part of a parameter value, from a first character, with a previously defined character string class, replace the part with a longest character string class that matches the character string class, and conduct conversion for a class sequence in which replaced character string classes are sequentially arranged;
   store, as the profile in the memory, a class sequence with an appearance frequency of equal to or more than a predetermined value in a group of the class sequences that are obtained by the parameter extraction and the class conversion with regard to the access request of normal data as learning data; and
   calculate a degree of similarity between the profile and the class sequence that is obtained by the parameter extraction and the class conversion with regard to the access request, which is an analysis target, and determine whether an attack on the information processing apparatus occurs in accordance with the degree of similarity.

3. The attack detecting device according to claim 2, wherein the processing circuitry stores, as the profile in the memory, a single class sequence with the appearance frequency of maximum in the group of the class sequences.

4. The attack detecting device according to claim 2, wherein the processing circuitry stores, as the profile in the memory, multiple class sequences with the appearance frequency of equal to or more than a predetermined value in the group of the class sequences.

5. The attack detecting device according to claim 2, wherein
   in a case where the group of the class sequences satisfies a predetermined condition, the processing circuitry stores, as the profile in the memory, a unique group of all the character string classes, included in the group of the class sequences, and
   the processing circuitry
   in a case where the group of the class sequences satisfies a predetermined condition, determines whether an attack occurs depending on whether the profile includes the entire unique group of the character string classes in the class sequence of the analysis-target data during determination by using the degree of similarity, and
   in a case where the group of class sequences does not satisfy the predetermined condition, calculates the degree of similarity between the profile and the class sequence of the analysis-target data.

6. The attack detecting device according to claim 4, wherein
   the processing circuitry
   in a case where the multiple class sequences satisfy a predetermined condition, stores, as the profile in the memory, a unique group of all the character string classes included in the multiple class sequences,
   in a case where the group of the multiple class sequences satisfies a predetermined condition, determines whether an attack occurs depending on whether the profile includes the entire unique group of the character string classes in the class sequence of the analysis-target data during determination by using the degree of similarity, and
   in a case where the group of the multiple class sequences does not satisfy the predetermined condition, makes a determination by using a degree of similarity of a maximal value among the degrees of similarity between the class sequence of the analysis-target data and each of the multiple class sequences included in the profile.

7. An attack detection method by an attack detecting device that detects an attack on an information processing apparatus connected to a network, extracting each parameter from an access request in normal data, received from a client device via the network, as learning data for the information processing apparatus, comparing each part of a parameter value, from a first character, with a previously defined character string class with regard to each parameter, replacing the part with a longest character string class that matches the character string class, conducting conversion for a class sequence in which replaced character string classes are sequentially arranged, and storing, in a storage unit as a profile that is a criteria for determining whether analysis-target data indicates an attack on the information processing apparatus, a class sequence with an appearance frequency of equal to or more than a predetermined value in a group of the class sequences;

extracting a parameter from the access request in the analysis-target data;

converting a value of the extracted parameter into the class sequence in accordance with the character string class;

calculating a degree of similarity between the class sequence and the profile; and determining whether an attack on the information processing apparatus occurs in accordance with the degree of similarity.

8. A non-transitory computer-readable recording medium having stored a program causing a computer, which detects an attack on an information processing apparatus connected to a network, to execute a process comprising:

a step of extracting each parameter from an access request in normal data, received from a client device via the network, as learning data for the information processing apparatus, comparing each part of a parameter value, from a first character, with a previously defined character string class with regard to each parameter, replacing the part with a longest character string class that matches the character string class, conducting conversion for a class sequence in which replaced character string classes are sequentially arranged, and storing, in a storage unit as a profile that is a criteria for determining whether analysis-target data indicates an attack on the information processing apparatus, a class sequence with an appearance frequency of equal to or more than a predetermined value in a group of the class sequences;

a step of extracting a parameter from the access request in the analysis-target data;

a step of converting a value of the extracted parameter into the class sequence in accordance with the character string class;

a step of calculating a degree of similarity between the class sequence and the profile; and a step of determining whether an attack on the information processing apparatus occurs in accordance with the degree of similarity.

* * * * *